United States Patent
Lee et al.

(10) Patent No.: US 9,242,170 B2
(45) Date of Patent: Jan. 26, 2016

(54) INTERACTIVE GAME METHOD

(71) Applicant: Quanta Computer Inc., Kuei Shan Hsiang, Tao Yuan Shien (TW)

(72) Inventors: Te-Chun Lee, Tao Yuan Shien (TW); Yu-Liang Shih, Tao Yuan Shien (TW); Jyun-Jie Chen, Tao Yuan Shien (TW); Jung-Wen Chang, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 143 days.

(21) Appl. No.: 14/280,860

(22) Filed: May 19, 2014

(65) Prior Publication Data
US 2015/0190710 A1    Jul. 9, 2015

(30) Foreign Application Priority Data

Jan. 7, 2014    (TW) .............................. 103100474 A

(51) Int. Cl.
| | |
|---|---|
| *A63F 3/00* | (2006.01) |
| *G06F 3/01* | (2006.01) |
| *A63F 13/98* | (2014.01) |
| *A63F 9/24* | (2006.01) |

(52) U.S. Cl.
CPC ............. *A63F 3/00697* (2013.01); *A63F 13/98* (2014.09); *G06F 3/01* (2013.01); *A63F 2003/0076* (2013.01); *A63F 2003/00652* (2013.01); *A63F 2003/00719* (2013.01); *A63F 2009/2485* (2013.01); *A63F 2009/2486* (2013.01)

(58) Field of Classification Search
None
See application file for complete search history.

(56) References Cited

U.S. PATENT DOCUMENTS

| | | | | |
|---|---|---|---|---|
| 6,361,047 | B1* | 3/2002 | Militello ............. | A63F 3/00574 273/239 |
| 2004/0005921 | A1* | 1/2004 | Shinoda ................... | G07F 1/06 463/29 |
| 2008/0315518 | A1* | 12/2008 | Kuo ..................... | A63F 3/00697 273/241 |
| 2012/0220355 | A1* | 8/2012 | Haltovsky ............... | A63F 13/12 463/16 |
| 2014/0120995 | A1* | 5/2014 | Duplat .................... | A63F 13/02 463/9 |

FOREIGN PATENT DOCUMENTS

CN    202444525    9/2012

OTHER PUBLICATIONS

Taiwanese language office action dated Jun. 11, 2015, issued in application No. TW 103100474.

* cited by examiner

*Primary Examiner* — Jason Yen
(74) *Attorney, Agent, or Firm* — McClure, Qualey & Rodack, LLP

(57) ABSTRACT

The present invention provides a method of interactive gaming applied to an interactive case and a tablet, wherein the interactive case is arranged to be attached on the tablet, and the interactive case includes a transmission port arranged to communicate with the tablet and a plurality of notches. The method of interactive game includes determining whether at least one accessory medal is connected to the notch; when one of the accessory medals is connected to one of the notches, retrieving a predetermined data stored in the connected accessory medal; identifying the connected accessory medal according to the predetermined data of the connected accessory medal; and performing an application corresponding to the connected accessory medal.

11 Claims, 10 Drawing Sheets

INTERACTIVE GAME METHOD

CROSS REFERENCE TO RELATED APPLICATIONS

This application claims priority of Taiwan Patent Application No. 103100474, filed on Jan. 7, 2014, the entirety of which is incorporated by reference herein.

BACKGROUND OF THE INVENTION

1. Field of the Invention

The present invention is related to an interactive game method, and in particular to an interactive game method with an interactive case and medals.

2. Description of the Related Art

Presently, mobile devices are highly developed and multi-functional. For example, handheld devices such as mobile phones and tablets are capable of conducting telecommunications, receiving and transmitting e-mails, maintaining social networks, managing contacts, and playing media. Hence, users can implement various applications on their mobile devices, such as a simple phone call, social network interaction, or commercial transactions. Therefore, mobile devices have become one of the necessities in people's lives.

There are many electronic devices equipped with at least one transmission port arranged to connect with the peripheral devices. Furthermore, the varieties of peripheral accessories of electronic devices are steadily increasing, along with the application methods that go along with the accessories, greatly increasing the diversity and attractiveness of the applications.

BRIEF SUMMARY OF THE INVENTION

A detailed description is given in the following embodiments with reference to the accompanying drawings.

The present invention provides an interactive game method applied to an interactive case and a tablet, wherein the interactive case is arranged to be attached to the tablet, and the interactive case has a plurality of notches and a transmission port arranged to connect and communicate with the tablet. The interactive game method includes: determining whether at least one accessory medal is connected to one of the notches of the interactive case when the tablet executes a first game program or a second game program; reading a predetermined data segment stored in the connected accessory medal when the accessory medal is connected to the interactive case; identifying the connected accessory medal according to the predetermined data segment; and performing an application corresponding to the connected accessory medal according to the predetermined data segment of the connected accessory medal.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
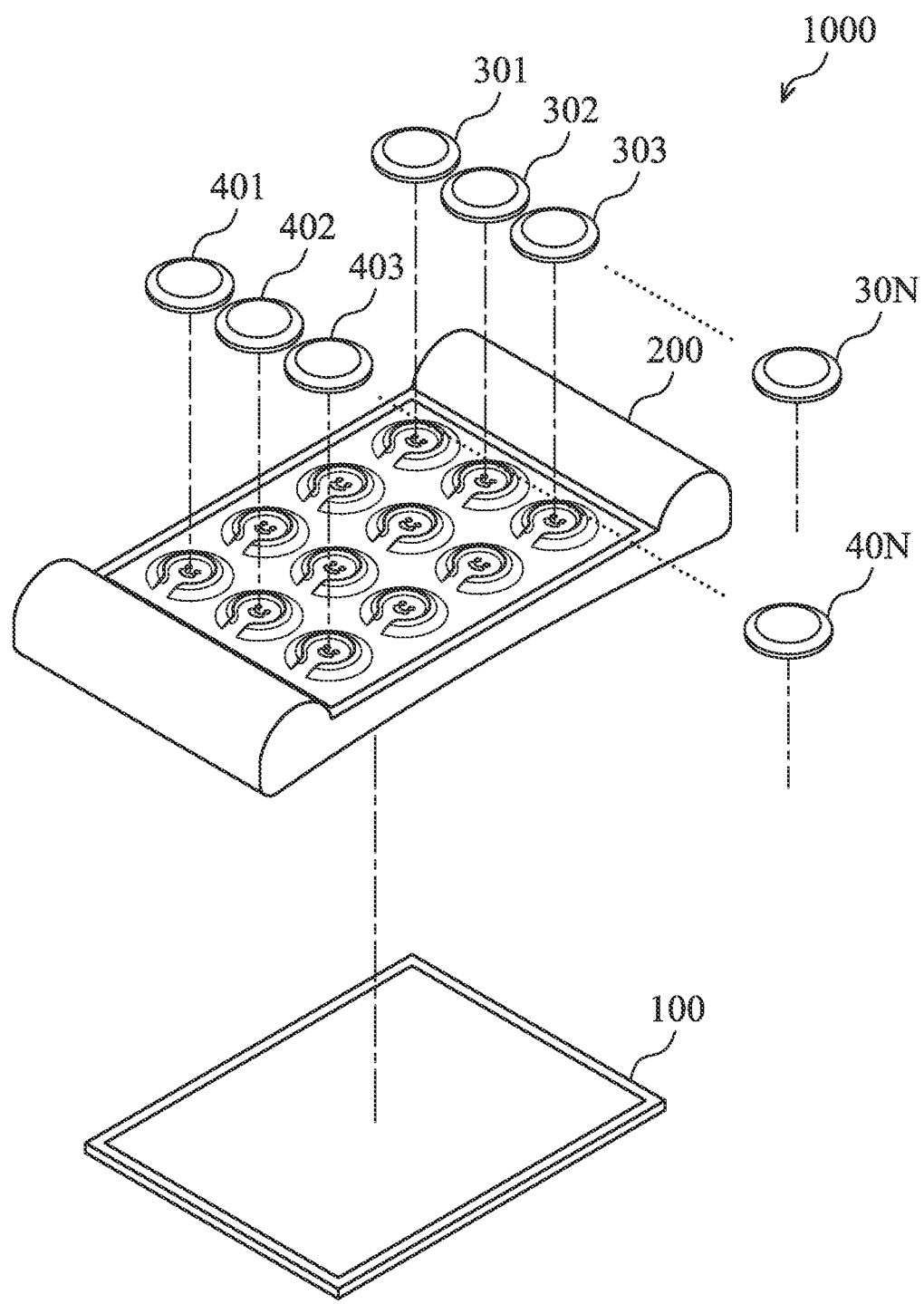
FIG. 1 is a schematic diagram illustrating an embodiment of a game system of the present invention.

FIG. 1 is a schematic diagram illustrating an embodiment of a game system of the present invention. The game system 1000 includes a tablet 100, an interactive case 200, a plurality of accessory medals 301-30N and a plurality of application medals 401-40N. The interactive case 200 is arranged to be attached on the back of the tablet 100. The interactive case 200 has a transmission port arranged to connect to a transmission port of the tablet 100 and communicate with the tablet 100 through the transmission port. The interactive case 200 further has a plurality of notches arranged to be connected with the accessory medals 301-30N and the application medals 401-40N. For example, the transmission port of the interactive case 200 can be a USB plug, a Mini USB plug, a Micro USB plug or a mini lightning plug, but it is not limited thereto. The transmission port of the tablet 100 can be a USB slot, a Mini USB slot, a Micro USB slot, or a mini lightning slot, but it is not limited thereto. In this embodiment, the transmission port of the interactive case 200 is arranged to transmit data to and receive data from the tablet 100 based on a SPI interface or an I2C interface. Moreover, each of the notches is arranged to be connected with an accessory medal or an application medal, but it is not limited thereto.

Figure 2:
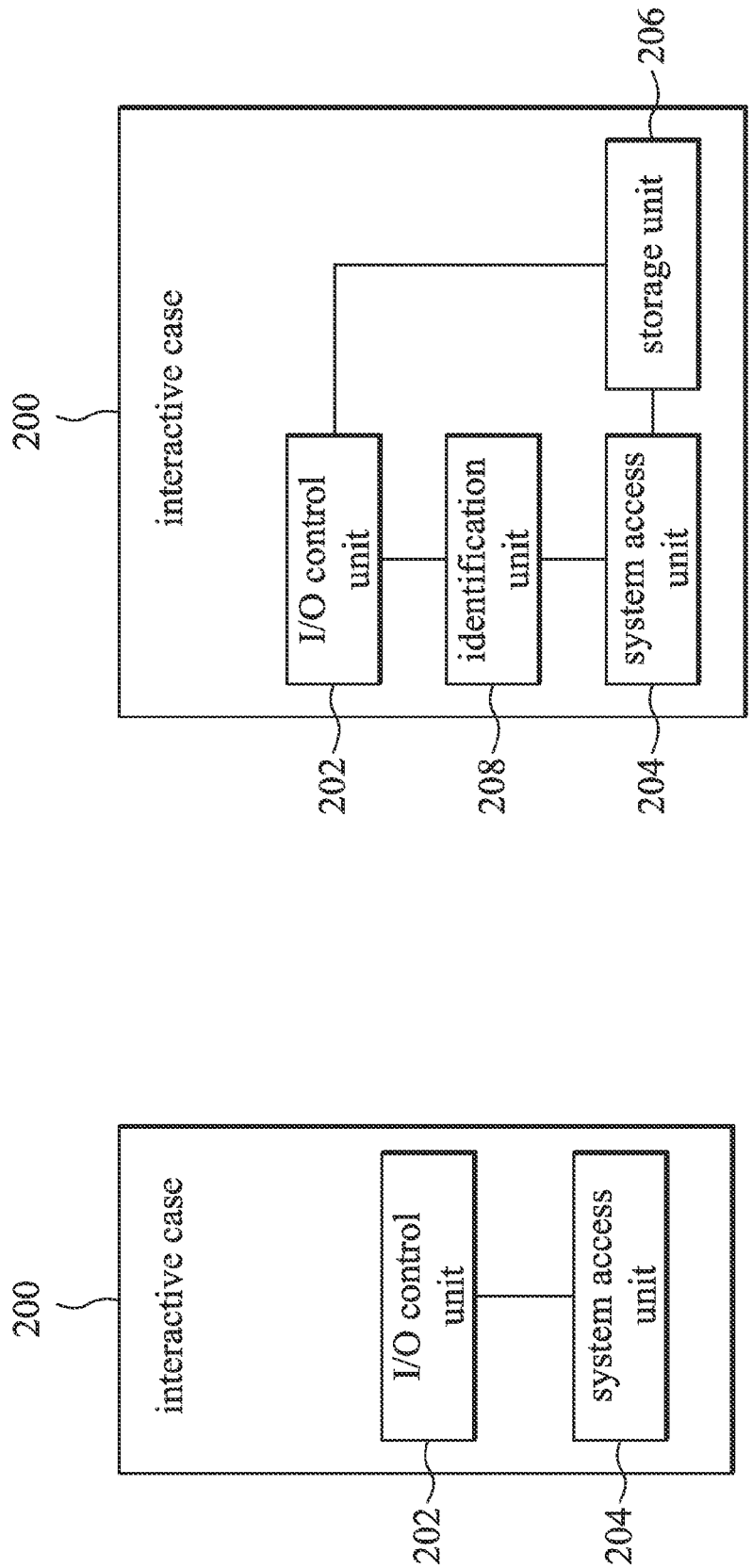
FIG. 2A is a schematic diagram illustrating an embodiment of an interactive case of the present invention.
FIG. 2B is a schematic diagram illustrating another embodiment of an interactive case of the present invention.

FIG. 2A is a schematic diagram illustrating an embodiment of an interactive case of the present invention. In this embodiment, the interactive case 200 includes an I/O control unit 202 and a system access unit 204. The I/O control unit 202 is coupled between the plurality of notches and the system access unit 204, wherein the I/O control unit 202 is arranged to retrieve the data from the connected accessory medals 301-30N and the connected application medals 401-40N through the notches, transmit the data retrieved from the connected accessory medals 301-30N and the connected application medals 401-40N to the system access unit 204, and transmit the commands to the connected accessory medals 301-30N and the connected application medals 401-40N. Moreover, each of the notches has a plurality of pins. The pins are arranged to be coupled to the to the accessory medals 301-30N and the application medals 401-40N connected with the notches for transmitting data with the accessory medals 301-30N and the application medals 401-40N connected with the notches, and detect whether the accessory medals 301-30N and the application medals 401-40N are placed in the notches. The system access unit 204 is arranged to be connected between the I/O control unit 202 and the transmission port, wherein the system access unit 204 is arranged to transmit data to or receive data from the tablet 100 through the transmission port, and transmit data to or receive data from the accessory medals 301-30N and the application medals 401-40N through the I/O control unit 202.

FIG. 2B is a schematic diagram illustrating another embodiment of an interactive case of the present invention. In this embodiment, the interactive case 200 includes an I/O control unit 202, a system access unit 204, a storage unit 206 and an identification unit 208. The interactive case 200 of FIG. 2B is similar to the interactive case 200 of FIG. 2A except that the interactive case 200 of FIG. 2B further includes a storage unit 206 coupled between the I/O control unit 202 and the system access unit 204. The storage unit 206 is arranged to store the data retrieved from the accessory medals 301-30N and the application medals 401-40N through the I/O control unit 202 or the data retrieved from the tablet 100 through the system access unit 204. For example, the storage unit 206 can be a buffer arranged to temporarily store the retrieved data for improving system performance. Moreover, the identification unit 208 can be an identification chip implemented in the tablet 100 to identify whether the interactive case 200 is a licensed device for preventing piracy. Moreover, the identification unit 208 is further arranged to identify whether the connected accessory medals 301-30N and the connected application medals 401-40N is a conformed device for preventing piracy.

Figure 3:
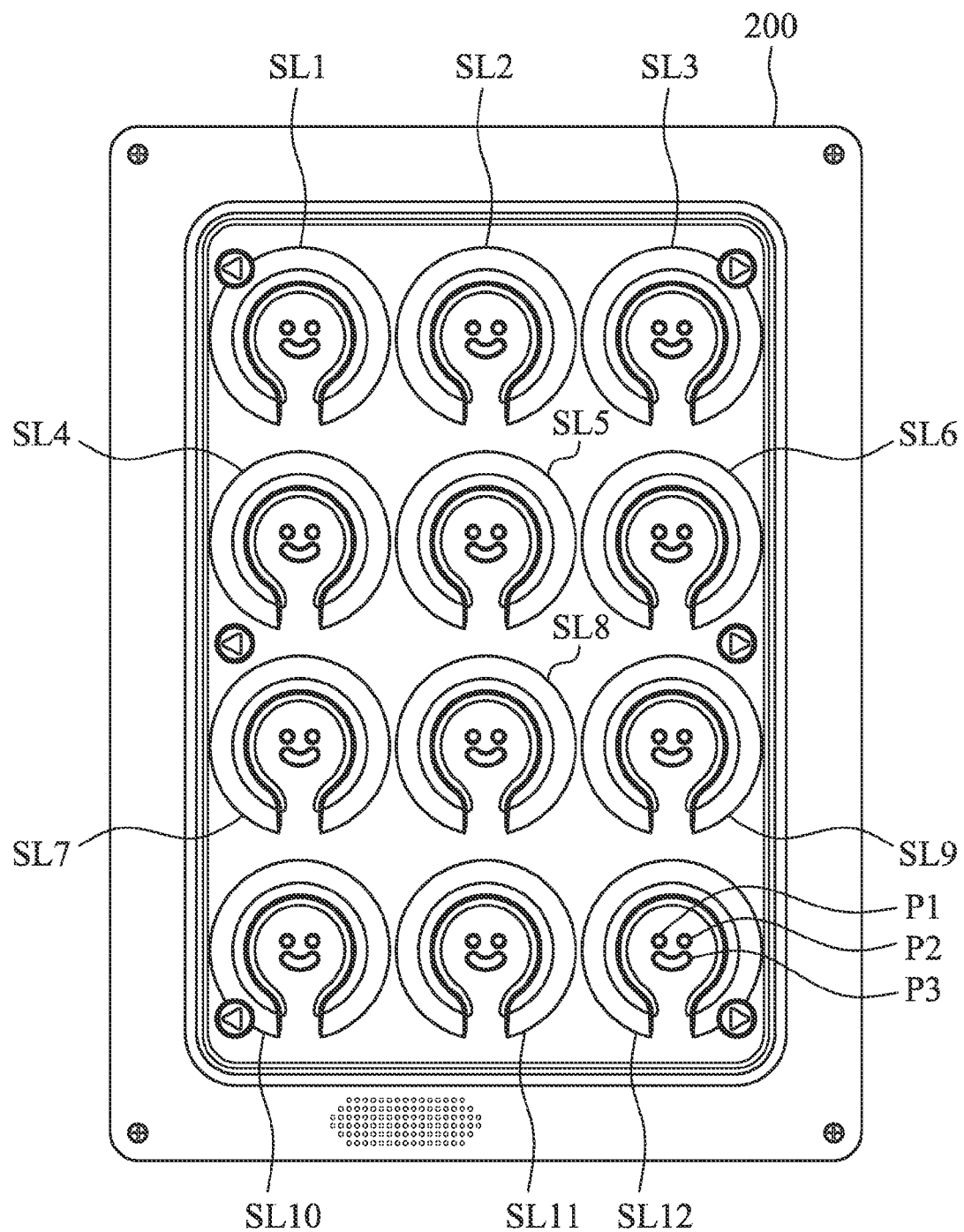
FIG. 3 is a schematic diagram illustrating an embodiment of the appearance of the interactive case of the present invention.

FIG. 3 is a schematic diagram illustrating an embodiment of an appearance of the interactive case of the present invention. In FIG. 3, the interactive case has twelve notches SL1-SL12 arranged to be connected with the accessory medals 301-30N and the application medals 401-40N. Each of the notches SL1-SL12 has three pins P1-P3 arranged to be coupled to the accessory medals 301-30N and the application medals 401-40N placed in the notches, but it is not limited thereto. In other embodiments, the amount of notches is more than 12 or less than 12, but the amount of pins of the notches is not limited thereto.

Figure 4:
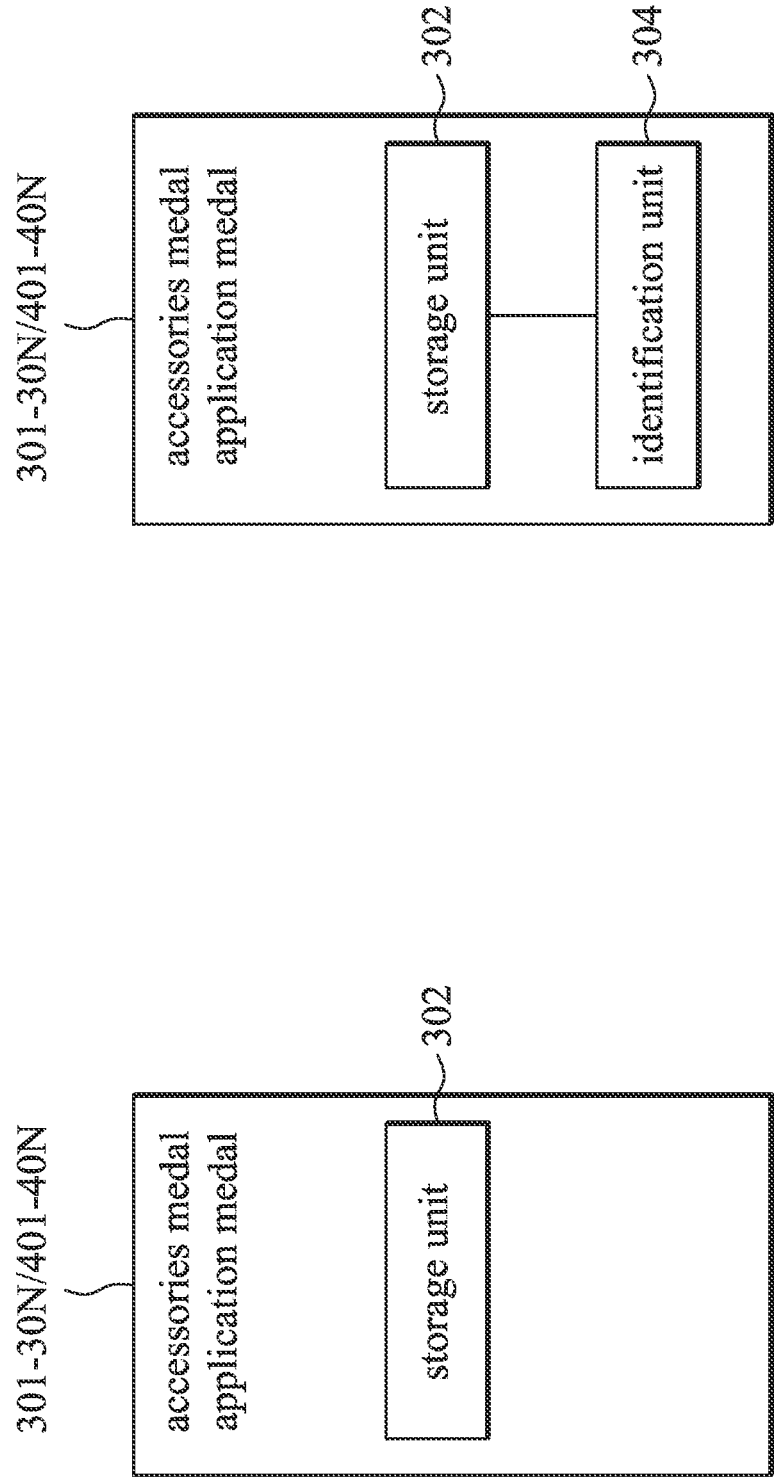
FIG. 4A is a schematic diagram illustrating an embodiment of a medal of the present invention.
FIG. 4B is a schematic diagram illustrating another embodiment of a medal of the present invention.

FIG. 4A is a schematic diagram illustrating an embodiment of a medal of the present invention. In this embodiment, each of the accessory medals 301-30N and the application medals 401-40N has a storage unit 302. The storage unit 302 is arranged to store an identification data segment. The tablet 100 is arranged to read the identification data segment from the accessory medals 301-30N or the application medals 401-40N through the interactive case 200 to identify whether the connected medal is accessory medal or application medal and the corresponding operation of the connected medal. It should be noted that the accessory medals 301-30N are the add-on accessories of game programs, and the add-on accessories are arranged to interact with the game programs. Moreover, the application medals 401-40N are the accessories arranged to launch the game programs. In one embodiment, the hardware structure of the accessory medals 301-30N and the application medals 401-40N are the same, but the identification data segment stored in each of the storage units 302 of the accessory medals 301-30N and the application medals 401-40N are different. Therefore, the tablet 100 may identify the accessory medals and the application medals according to the identification data segments, but it is not limited thereto. In other embodiments, the hardware structures of the accessory medals 301-30N and the application medals 401-40N can be different. For example, the appearances and/or the amounts of pins of the accessory medals 301-30N and the application medals 401-40N may be different, such that the tablet 100 can identify the application medals from the accessory medals through the interactive case 200.

FIG. 4B is a schematic diagram illustrating another embodiment of a medal of the present invention. In this embodiment, the accessory medals 301-30N and the application medals 401-40N further include an identification unit 304. The identification unit 304 can be an identification chip implemented in the tablet 100 to identify whether the interactive case 200 is a conformed device for preventing piracy.

Figure 5:
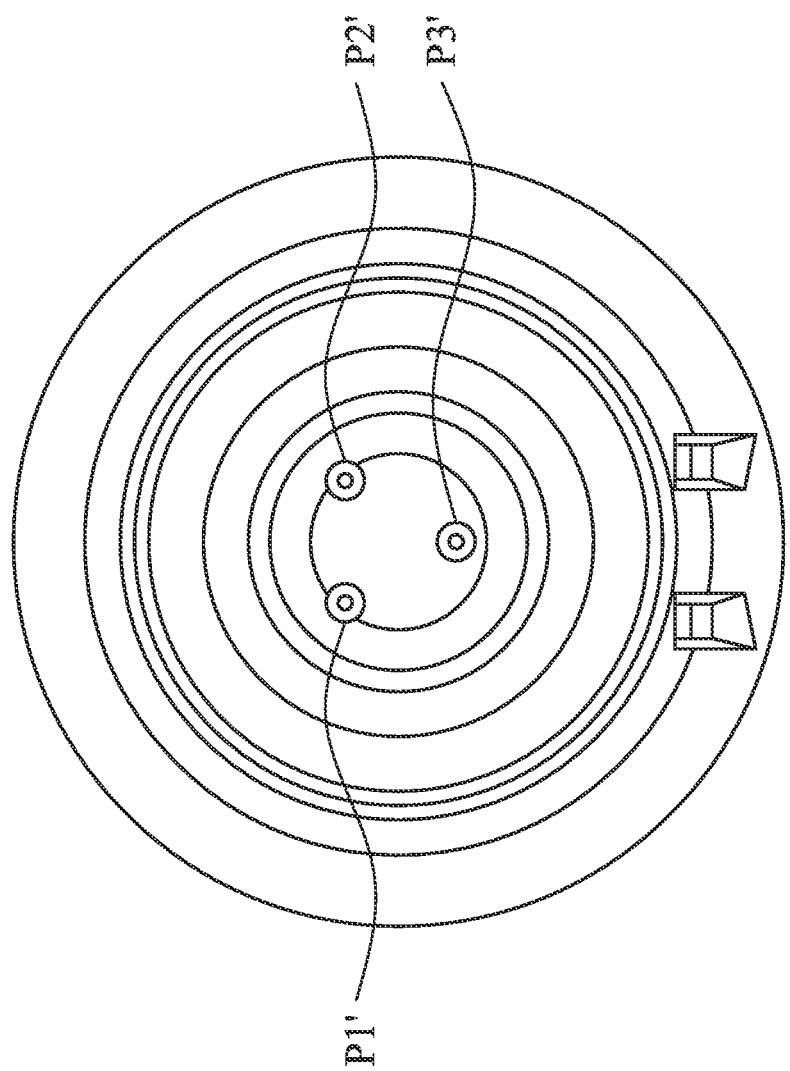
FIG. 5 is a schematic diagram illustrating an embodiment of the appearance of the medal of the present invention.

FIG. 5 is a schematic diagram illustrating an embodiment of the appearance of the medal of the present invention. In this embodiment, each of the accessory medals 301-30N and the application medals 401-40N has a bottom side, the bottom side has three pins P1'-P3' arranged to be coupled to the pins P1-P3 of the notches SL1-SL12 of the interactive case 200 for transmitting data. It should be noted that, in another embodiment, the accessory medals 301-30N and the application medals 401-40N further have an output device (not shown) arranged to produce output signals to users, wherein the output device can be a light-emitting device, a display screen, a speaker, etc., but it is not limited thereto. For example, the output device can be an LED arranged to output continuous light or flashing light.

Figure 6:
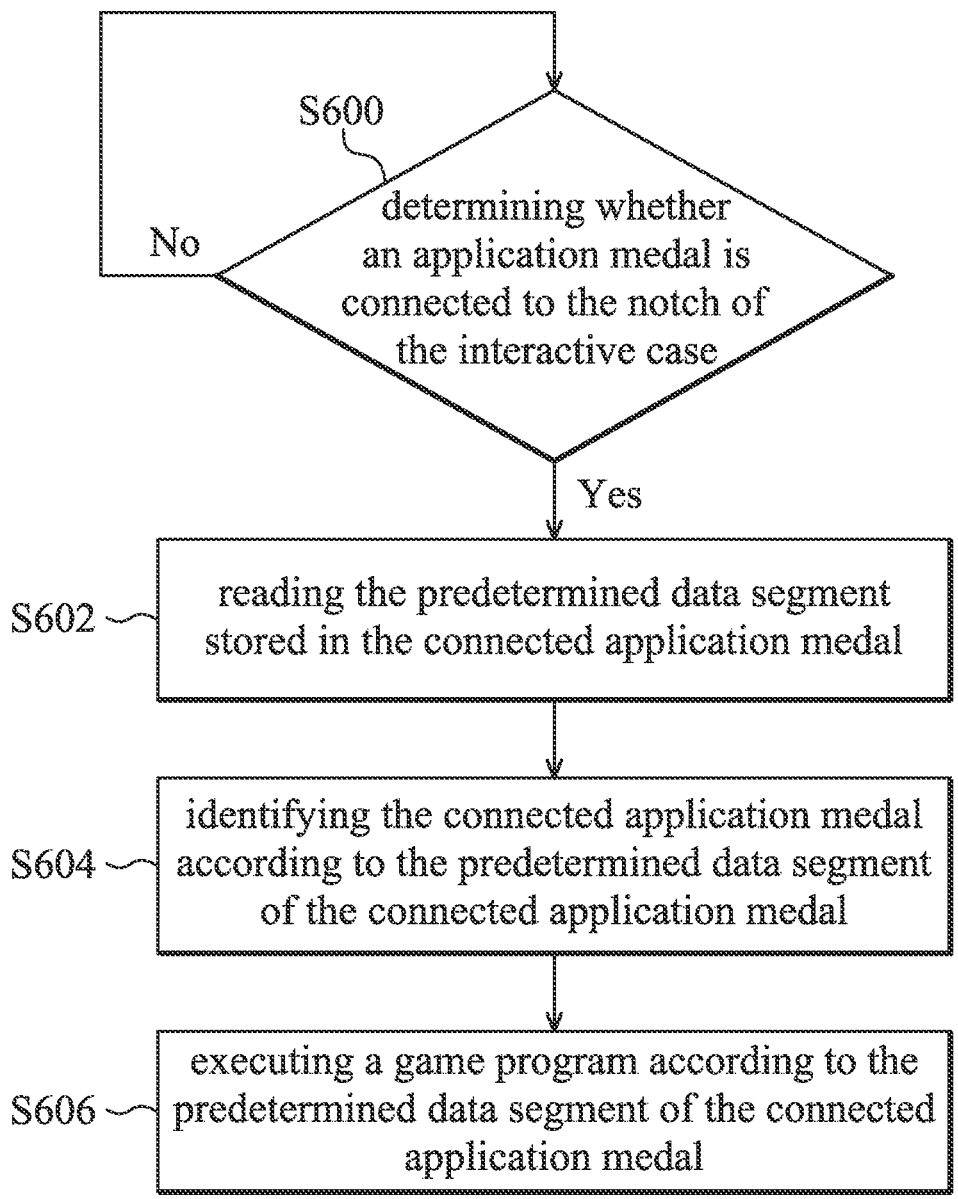
FIG. 6 is a flowchart of activating application method according to an embodiment of the present invention.

FIG. 6 is a flowchart of activating application method of an interactive game method according to an embodiment of the present invention. In this embodiment, the interactive game method is applied to the game system 1000 of FIG. 1, and is arranged to launch the game programs by the application medals 401-40N. The process starts at step S600.

In step S600, the tablet 100 or the interactive case 200 determines whether an application medal is connected to one of the notches SL1-SL12 of the interactive case 200. When an application medal is connected to one of the notches SL1-SL12, the process goes to step S602, otherwise, the tablet 100 or the interactive case 200 continues to monitor whether an application medal is connected to one of the notches SL1-SL12 of the interactive case 200.

In step S602, the tablet 100 reads the predetermined data segment stored in the connected application medal through the interactive case 200. It should be noted that the tablet 100 enables the light-emitting device of the connected application medal to light through the interactive case 200 when the predetermined data segment of the connected application medal is successfully read by the tablet 100. For example, the tablet 100 may enable the light-emitting device of the connected application medal to flash once when the predetermined data segment of the connected application medal is successfully read by the tablet 100, but it is not limited thereto. In another embodiment, the processing unit (not shown) of the tablet 100 may enable a display screen (not shown) of the tablet 100 to show the image corresponding to the connected application medal when the predetermined data segment of the connected application medal is successfully read by the tablet 100.

Moreover, in another embodiment, the tablet 100 may vibrate and enable the light-emitting device of the connected application medal to light through the interactive case to notify the user of the read failure when the tablet 100 is fail to read the predetermined data segment of the connected application medal. Next, the tablet 100 disables the vibration and turns off the light of the light-emitting device of the connected application medal when the connected application medal, which is failed to be read by the tablet 100, is removed from the interactive case 200, but it is not limited thereto. It should be noted that the tablet 100 or the interactive case 200 also fail to read the predetermined data segment of the connected application medal when the tablet 100 or the interactive case 200 cannot identify the connected application medal. Namely, the connected application medal is piracy when the tablet 100 or the interactive case 200 cannot identify the connected application medal, but it is not limited thereto. In another embodiment, the reason for the read failure may be damage to data stored in the connected application medal or damage to the control chip of the connected application medal.

Next, in step S604, the tablet 100 identifies the connected application medal according to the predetermined data segment of the connected application medal. It should be noted that step S604 may further include recording the connection time of the connected application medal and the notch connected with the connected application medal by the tablet 100 or the interactive case 200, wherein the connection time is the time at which the application medal connects to the interactive case 200.

Next, in step S606, the tablet 100 executes a game program according to the predetermined data segment of the connected application medal. The process ends at step S606.

Figure 7:
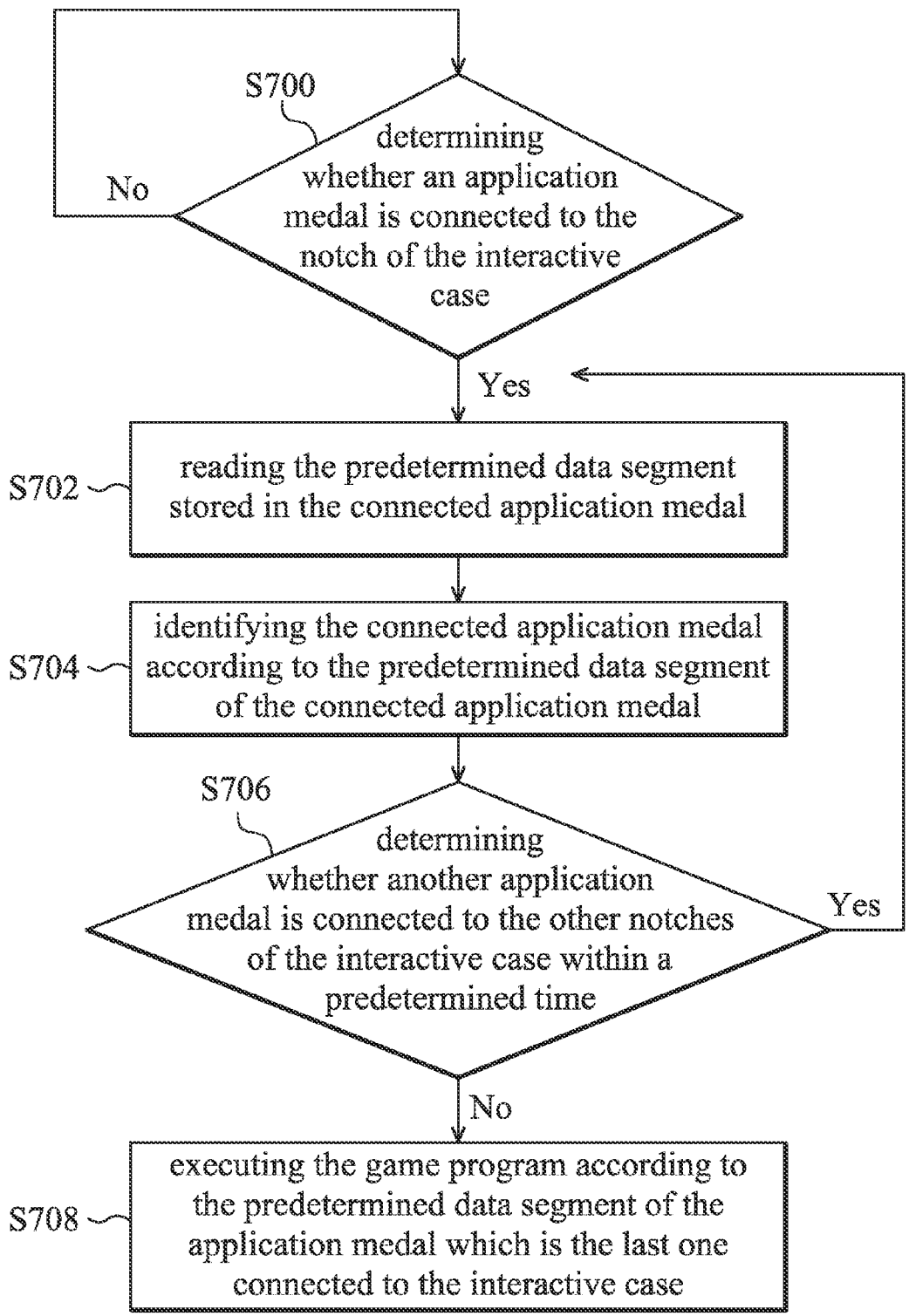
FIG. 7 is a flowchart of activating application method according to another embodiment of the present invention.

FIG. 7 is a flowchart of activating application method of an interactive game method according to another embodiment of the present invention. In this embodiment, the interactive game method is applied to the game system 1000 of FIG. 1 and is arranged to launch the corresponding game program in response to the application medals 401-40N. The process starts at step S700.

In step S700, the tablet 100 or the interactive case 200 determines whether an application medal is connected to one of the notches SL1-SL12 of the interactive case 200. When an application medal is connected to one of the notches SL1-SL12 of the interactive case 200, the process goes to step S702, otherwise, the tablet 100 or the interactive case 200 continues to monitor whether an application medal is connected to one of the notches SL1-SL12 of the interactive case 200.

In step S702, the tablet 100 reads the predetermined data segment stored in the connected application medal by the interactive case 200. It should noted that, in this embodiment, the tablet 100 reads the predetermined data segment from the application medal which is the last one connected to the interactive case 200 by the interactive case 200 in step S702 when more than two application medals are connected with the interactive case 200. Moreover, when the predetermined data segment of the connected application medal is successfully read, the tablet 100 enables the light-emitting device of the connected application medal to light. For example, the tablet 100 may enable the light-emitting device of the connected application medal to flash once when the predetermined data segment of the connected application medal is successfully read by the tablet 100. In another embodiment, the processing unit (not shown) of the tablet 100 may enable a display screen (not shown) of the tablet 100 to show the image corresponding to the connected application medal when the predetermined data segment of the connected application medal is successfully read by the tablet 100.

Moreover, in another embodiment, the tablet 100 may vibrate and enable the light-emitting device of the application medal to light to notify the user of the read failure when the predetermined data segment of the connected application medal is not successfully read. Next, the vibration of the tablet and the light-emitting device of the application medal are disabled when the application medal which is failed to be read is removed from the interactive case 200, but it is not limited thereto. It should be noted that the tablet 100 or the interactive case 200 also fail to read the predetermined data segment of the connected application medal when the tablet 100 or the interactive case 200 cannot identify the connected application medal. Namely, the connected application medal is considered to be counterfeit when the tablet 100 or the interactive case 200 cannot identify the connected application medal, but it is not limited thereto. In another embodiment, the reason for the read failure may be damage to data stored in the connected application medal or damage to the control chip of the connected application medal.

Next, in step S704, the tablet 100 identifies the connected application medal according to the predetermined data segment of the connected application medal. It should be noted that, in step S704, the tablet 100 is arranged to identify the application medal which is the last one connected to the interactive case 200 according to the predetermined data segment of the last application medal when more than two application medals are connected to the interactive case 200. In another embodiment, step S704 may further include recording the connection time of the connected application medal and the notch connected with the connected application medal by the tablet 100 or the interactive case 200, wherein the connection time is the time that the application medal connects to the interactive case 200.

Next, in step S706, the tablet 100 determines whether another application medal is connected to the other notches of the interactive case 200 within a predetermined time since the connected application medal is connected to the interactive case 200. For example, the predetermined time may be 5 seconds, but it is not limited thereto. In other embodiments, the predetermined time may be 2, 3, 4, 6, 7, 8, 9 or 10 seconds, etc. It should be noted that, in step S706, the tablet 100 is arranged to determine whether another application medal is connected to the other notches of the interactive case 200 within a predetermined time since the application medal, which was the last one connected to the interactive case 200, is connected to the interactive case 200 when more than two application medals are connected to the interactive case 200. When another application medal is connected to the other notches of the interactive case 200 in the predetermined time, the process returns to step S702, the tablet 100 reads the predetermined data segment from the other application medal through the interactive case 200. When no application medal is connected to the other notches of the interactive case 200 in the predetermined time, the process goes to step S708.

In step S708, the tablet 100 executes the game program according to the predetermined data segment of the application medal which is the last one connected to the interactive case 200. Namely, in step S708, the tablet 100 is arranged to execute the game program corresponding to the last of the application medals connected with the interactive case 200. It should be noted that the tablet 100 enables the light-emitting device of the application medal to continuous light when the game program of the application medal is executing, but it is not limited thereto. The process ends at step S708.

For example, the tablet 100 reads the predetermined data segment stored in the application medal 401 through the interactive case 200 to identify the first application medal 401 and records the position and connection time of the first application medal 401 when a first application medal 401 is connected to the notch SL1 of the interactive case 200. Namely, the tablet 100 records the connection relationship between the application medal 401 and the notch SL1, and the time the application medal 401 was connected to the interactive case 200. When a second application medal 402 is connected to the notch SL6 of the interactive case 200 within 5 seconds after the first application medal 401 was connected to the interactive case 200, the tablet 100 reads the predetermined data segment from the second application medal 402 through the interactive case 200 to identify the second application medal 402 and records the position (the notch SL6) and connection time of the second application medal 402. When no application medal is connected to the interactive case 200 within the 5 seconds following the second application medal 402 being connected to the interactive case 200, the tablet 100 executes the game program corresponding to the second application medal 402. When another application medal is connected to the interactive case 200 within the 5 seconds following the second application medal 402 being connected to the interactive case 200, the tablet 100 repeats the above steps of reading the predetermined data segment and identifying the connected application medal, but it is not limited thereto.

Figure 8:
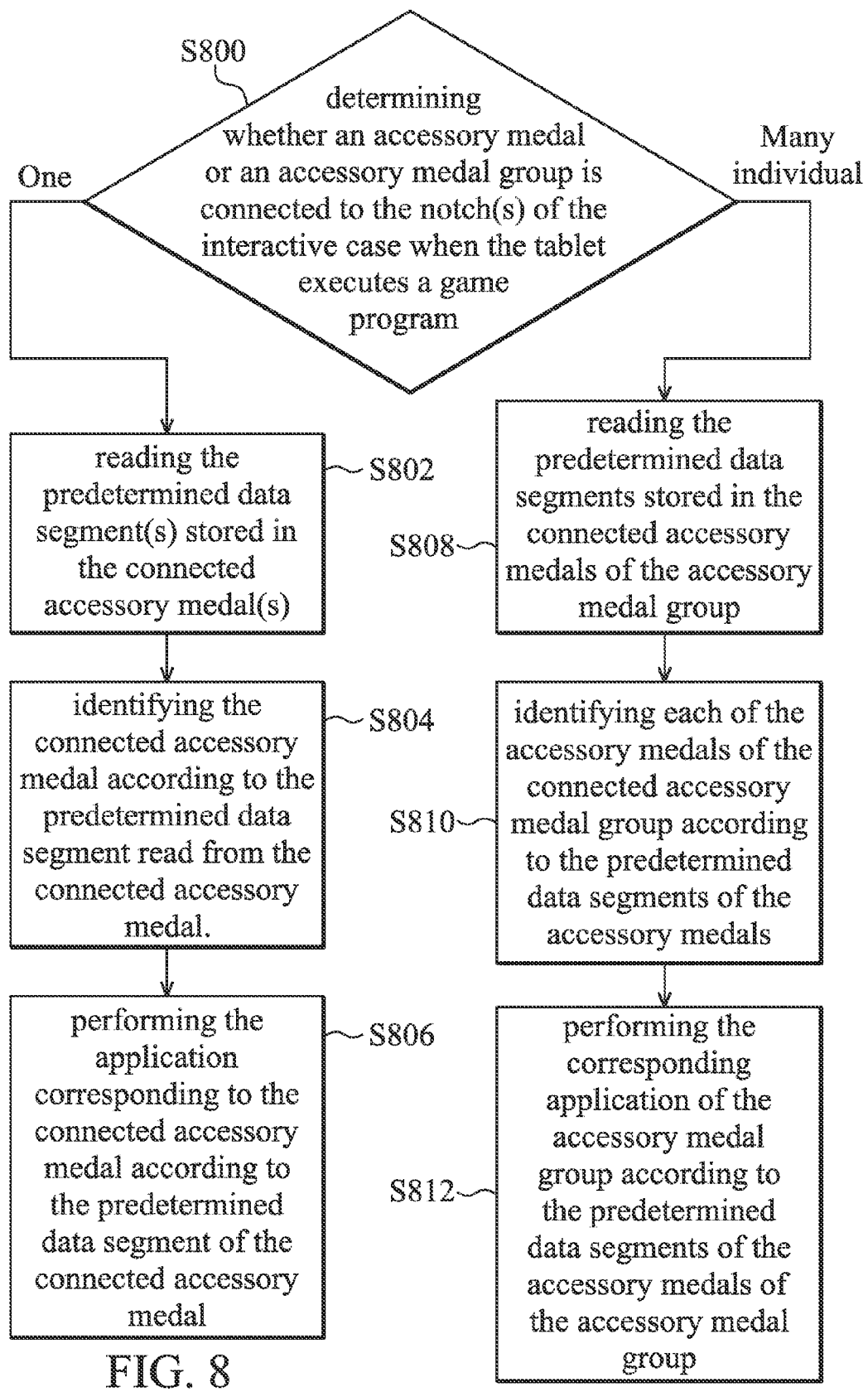
FIG. 8 is a flowchart of application operating method according to an embodiment of the present invention.

FIG. 8 is a flowchart of an application operating method of an interactive game method according to an embodiment of the present invention. In this embodiment, the interactive game method is applied to the game system 1000 of FIG. 1, and is arranged to perform the corresponding application according to the combinations of the accessory medals 301-30N during the game program. The process starts at step S800.

In step S800, when the tablet 100 executes a game program, the tablet 100 or the interactive case 200 determines whether an accessory medal or an accessory medal group is connected to the notch(es) of the interactive case 200. When an accessory medal is connected to one of the notches of the interactive case 200, the process goes to step S802. When an accessory medal group is coupled to the notches of the interactive case 200, the process goes to step S808. When no accessory medal and no accessory medal group are connected to the notch(es) of the interactive case 200, the tablet 100 continues to monitor whether an accessory medal or an accessory medal group is connected to the notch(s) of the interactive case 200. It should be noted that step S800 may further include recording the connection time(s) of the connected accessory medal and the notch(s) connected with the connected accessory medal by the tablet 100 or the interactive case 200, wherein the connection time is the time that the accessory medal connects to the interactive case 200. Moreover, the tablet 100 defines the connected accessory medals as an accessory medal group when the individual connection times of the connected accessory medals 301-30N to the interactive case 200 is less than a predetermined time, but it is not limited thereto. In other embodiments, the accessory medals placed in the predetermined notches constitute an accessory medal group.

In step S802, the tablet 100 reads the predetermined data segment(s) stored in the connected accessory medal(s) through the interactive case 200. Next, the process goes to step S804. In another embodiment, the tablet 100 enables the light-emitting device(s) of the connected accessory medal(s) to light through the interactive case 200 when the predetermined data segment of the connected accessory medal(s) is/are successfully read by the tablet 100, but it is not limited thereto. In another embodiment, the processing unit (not shown) of the tablet 100 may enable a display screen (not shown) of the tablet 100 to show the image(s) corresponding to the connected accessory medal(s) when the predetermined data segment of the connected accessory(s) medal is/are successfully read by the tablet 100, but it is not limited thereto.

Moreover, the tablet 100 may vibrate and enable the light-emitting device of the connected accessory medal to light through the interactive case to notify the user of the read failure when the tablet 100 is fail to read the predetermined data segment of the connected accessory medal, but it is not limited thereto. It should be noted that the tablet 100 or the interactive case 200 are also fail to read the predetermined data segment of the connected accessory medal when the tablet 100 or the interactive case 200 cannot identify the connected accessory medal. Namely, the connected accessory medal is piracy when the tablet 100 or the interactive case 200 cannot identify the connected accessory medal, but it is not limited thereto. In another embodiment, the reason of the read failure may be the damage of data stored in the connected accessory medal or the damage of the control chip of the connected accessory medal.

Next, in step S804, the tablet 100 identifies the connected accessory medal according to the predetermined data segment read from the connected accessory medal.

Next, in step S806, the tablet 100 performs the application corresponding to the connected accessory medal according to the predetermined data segment of the connected accessory medal. The process ends at step S806.

In step S808, the tablet 100 read the predetermined data segments stored in the connected accessory medals of the accessory medal group through the interactive case 200. In another embodiment, the tablet 100 enables the light-emitting devices of the connected accessory medals of the accessory medal group to light, sequentially, through the interactive case 200 when the predetermined data segment of the corresponding accessory medals is successfully read by the tablet 100, but it is not limited thereto. In another embodiment, the tablet 100 enables the light-emitting devices of the connected accessory medals of the accessory medal group to light at the same time when the predetermined data segments of the connected accessory medals of the connected accessory medal group are all successfully read by the tablet 100. In another embodiment, the processing unit (not shown) of the tablet 100 may enable a display screen (not shown) of the tablet 100 to show the image corresponding to the connected accessory medal group when the predetermined data segments of the connected accessory medals of the accessory medal group are all successfully read by the tablet 100, but it is not limited thereto.

Moreover, the tablet 100 may vibrate and enable the light-emitting device of the connected accessory medal to light through the interactive case to notice the user the read failure when the tablet 100 is fail to read the predetermined data segments of the connected accessory medal, but it is not limited thereto. Next, the tablet 100 disables the vibration and disables the light-emitting device of the connected accessory medal to light when the connected accessory medal which is failed to be read by the tablet 100 is removed from the interactive case 200, but it is not limited thereto.

Next, in step S810, the tablet 100 identifies each of the accessory medals of the connected accessory medal group according to the predetermined data segments of the accessory medals for detecting whether the accessory medal group has a corresponding application.

Next, in step S812, the tablet 100 performs the corresponding application of the accessory medal group according to the predetermined data segments of the accessory medals of the accessory medal group. The process ends at step S812. It should be noted that the tablet 100 performs the application of the accessory medal which is the last one connected to the interactive case 200 when the accessory medal group has no corresponding application, but it is not limited thereto. In another embodiment, the tablet 100 performs each of the applications of the connected accessory medals in sequence when the accessory medal group has no corresponding application.

Figure 9:
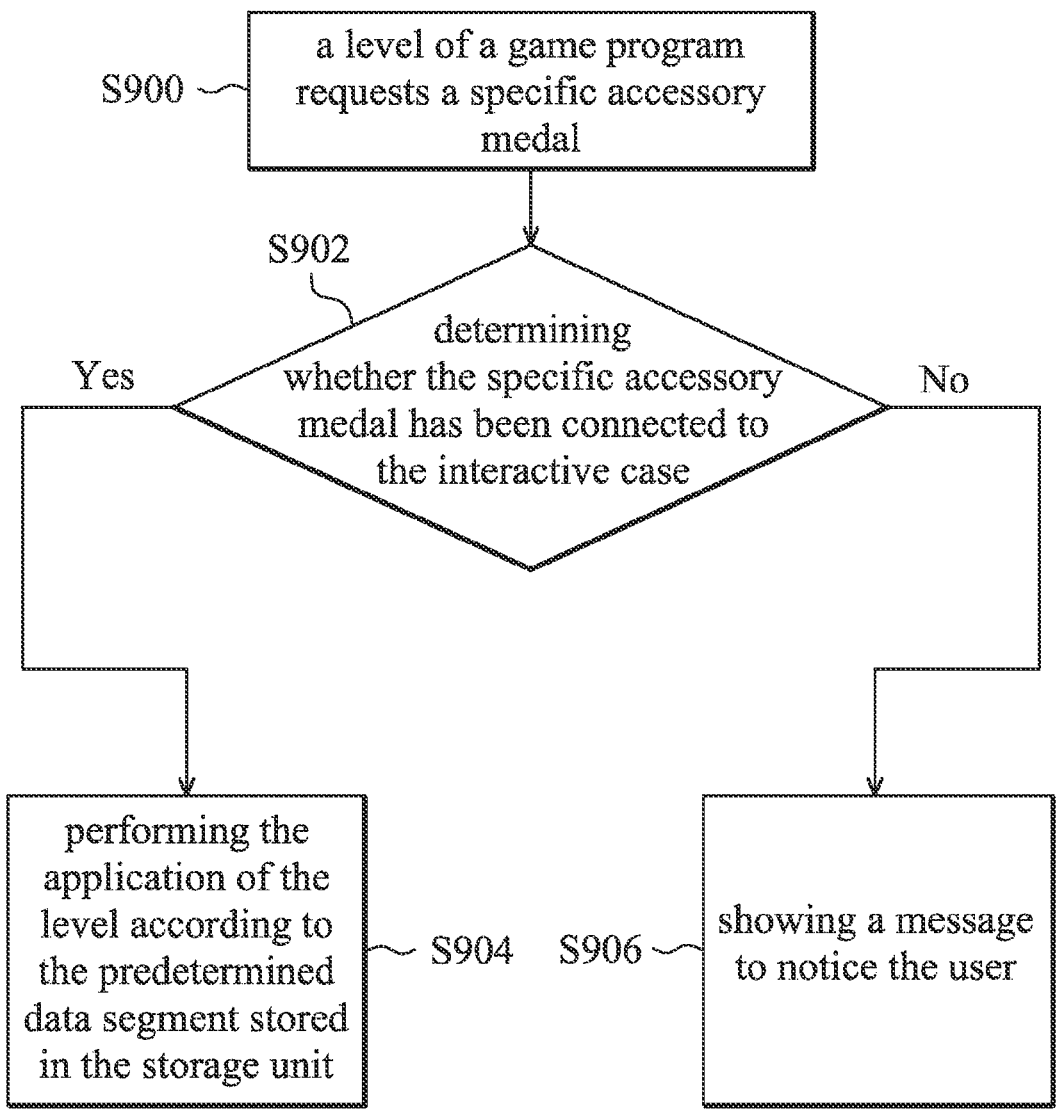
FIG. 9 is a flowchart of application operating method according to another embodiment of the present invention.

FIG. 9 is a flowchart of an application operating method of an interactive game method according to another embodiment of the present invention. In this embodiment, the interactive game method is applied to the game system 1000 of FIG. 1, and is arranged to perform the corresponding application in the level of the game program by the accessory medals 301-30N. The process starts at step S900.

In step S900, a level of a game program requests a specific accessory medal. It should be noted that, in this embodiment, the specific accessory medal may have been connected to the interactive case 200 before the level of the game program requests the specific accessory medal, wherein the predetermined data segment of the specific accessory medal has been stored in the storage unit of the tablet 100 or the interactive case 200.

In step S902, the tablet 100 determines whether the specific accessory medal has been connected to the interactive case 200. When the specific accessory medal is connected to the interactive case 200, the process goes to step S904, otherwise, the process goes to step S906. In another embodiment, in step S902, the tablet 100 may enable the light-emitting device of the specific accessory medal to light through the interactive case 200 when the specific accessory medal is connected to the interactive case 200.

In step S904, the tablet 100 performs the application of the level according to the predetermined data segment stored in the storage unit. The process ends at step S904.

In step S906, the display screen of the tablet 100 shows a message to notice the user to try other accessory medals when the connected accessory medal is not the specific accessory medal requested by the level or no accessory medal is connected to the interactive case 200. The process ends at step S906. It should be noted that, in this embodiment, the application of the level cannot be executed when the tablet 100 determines that the specific accessory medal is removed from the interactive case 200 (step s902) after the predetermined data segment is stored in the tablet 100. Moreover, in one embodiment, the predetermined data segments of the accessory medals 301-30N and the application medals 401-40N are stored in a volatile memory of the tablet 100.

Figure 10:
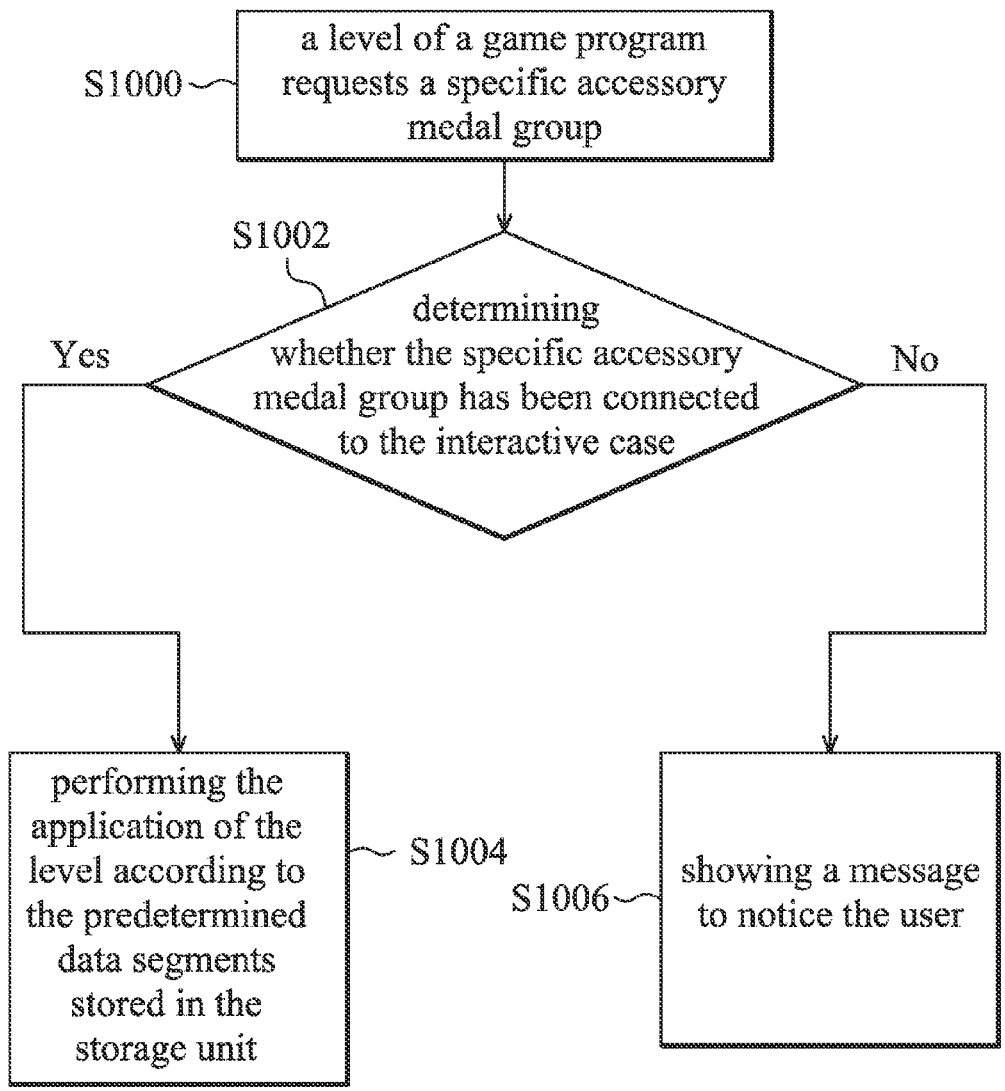
FIG. 10 is a flowchart of application operating method according to an embodiment of the present invention.

FIG. 10 is a flowchart of application operating method of an interactive game method according to an embodiment of the present invention. In this embodiment, the interactive game method is applied to the game system 1000 of FIG. 1, and is arranged to perform the corresponding application in the level of the game program by the accessory medals 301-30N. The process starts at step S1000.

In step S1000, a level of a game program requests a specific accessory medal group. It should be noted that, in this embodiment, the accessory medals of the specific accessory medal group may have been connected to the interactive case 200 before the level of the game program requests the specific accessory medal group, wherein the predetermined data segments of the specific accessory medal group have been stored in the storage unit of the tablet 100 or the interactive case 200.

In step S1002, the tablet 100 determines whether the specific accessory medal group is connected to the interactive case 200. When the specific accessory medal group is connected to the interactive case 200, the process goes to step S1004, otherwise, the process goes to step S1006. In another embodiment, in step S1002, the tablet 100 may enable the light-emitting devices of the accessory medals of the specific accessory medal group to light when the specific accessory medal group is connected to the interactive case 200.

In step S1004, the tablet 100 performs the application of the level according to the predetermined data segments stored in the storage unit. The process ends at step S1004.

In step S1006, the display screen of the tablet 100 shows a message to notice the user to try other accessory medals when the connected accessory medal is not the specific accessory medal group requested by the level or no accessory medal is connected to the interactive case 200. The process ends at step S1006. It should be noted that, in this embodiment, the application of the level cannot be executed when the tablet 100 determines that any of the accessory medals of the specific accessory medal group is removed from the interactive case 200 (step S1002) after the predetermined data segments are stored in the tablet 100.

Moreover, in one embodiment, when the tablet 200 is idling or the game program corresponding to the medal is idling, the tablet 200 enables the light-emitting device(s) of the connected accessory medal(s) and/or the connected application medal(s) to light in sequence according to the connection time at a second predetermined time interval.

The interactive game method of the present invention may execute the corresponding application on the tablet 100 by the interactive case 200, the application medals 401-40N and the accessory medals 301-30N.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An interactive game method, applied to an interactive case and a tablet, wherein the interactive case is arranged to be attached on the tablet, the interactive case has a plurality of notches and a transmission port arranged to connect and communicate with the tablet, and the interactive game method comprises:
   determining whether at least one accessory medal is connected to one of the notches of the interactive case when the tablet executes a first game program or a second game program;
   reading a predetermined data segment stored in the connected accessory medal when the accessory medal is connected to the interactive case;
   identifying the connected accessory medal according to the predetermined data segment; and performing an application corresponding to the connected accessory medal according to the predetermined data segment of the connected accessory medal.

2. The interactive game method as claimed in claim 1, further comprising recording a connection time that the accessory medal connects to the interactive case and the notch connected with the accessory medal.

3. The interactive game method as claimed in claim 2, comprising:
reading a predetermined data segment from each of the accessory medals of an accessory medal group when more than one of the accessory medals are connected with the interactive case and forms the accessory medal group;
identifying each of the accessory medals of the accessory medal group according to the predetermined data segments of each of the accessory medals of the accessory medal group; and
performing an application corresponding to the accessory medal group according to the predetermined data segments of each of the accessory medals of the accessory medal group.

4. The interactive game method as claimed in claim 3, further comprising defining the plurality of accessory medals as the accessory medal group when the individual connection times of the plurality of accessory medals to the interactive case are less than a first predetermined time.

5. The interactive game method as claimed in claim 3, comprising enabling a light-emitting device of the connected accessory medal to light when the predetermined data segment of the connected accessory medal is successfully read.

6. The interactive game method as claimed in claim 3, comprising enabling a display screen of the tablet to display an image corresponding to the connected accessory medal when the predetermined data segment of the connected accessory medal is successfully read.

7. The interactive game method as claimed in claim 3, further comprising:
enabling a light-emitting device of the connected accessory medal to light and enabling the tablet to vibrate when the predetermined data segment of the connected accessory medal is not successfully read; and
disabling the light-emitting device of the accessory medal from lighting up and disabling the tablet from vibrating when the connected accessory medal that failed to be read is removed from the interactive case.

8. The interactive game method as claimed in claim 2, further comprising enabling light-emitting devices of each of the connected accessory medals to light in sequence according to the individual connection times of the connected accessory medals at a second predetermined time interval when the tablet is idling.

9. The interactive game method as claimed in claim 1, further comprising:
determining whether at least one application medal is connected to the notches of the interactive case;
reading a predetermined data segment from the connected application medal when the application medal is connected to the interactive case;
identifying the connected application medal according to the predetermined data segment of the connected application medal; and
performing the first game program in response to the predetermined data segment of the connected application medal.

10. The interactive game method as claimed in claim 1, further comprising:
determining whether a first application medal of the application medals is connected to a first notch of the notches of the interactive case;
reading a predetermined data segment from the connected first application medal when the first application medal is connected to the interactive case;
identifying the connected first application medal according to the predetermined data segment of the connected first application medal;
determining whether another application medal is connected to the other notches except for the first notch of the interactive case within a third predetermined time since the first application medal is connected to the interactive case; and
performing the first game program according to the predetermined data segment of the connected first application medal when no other application medal is connected to the other notches of the interactive case within the third predetermined time since the first application medal is connected to the interactive case.

11. The interactive game method as claimed in claim 10, further comprising:
reading a predetermined data segment from a second application medal when the second application medal is connected to the other notches of the interactive case within the third predetermined time since the first application medal is connected to the interactive case;
identifying the connected second application medal according to the predetermined data segment read from the second application medal; and
performing the second game program in response to the predetermined data segment read from the second application medal.

* * * * *